United States Patent [19]

Tanabe

[11] Patent Number: 4,499,792
[45] Date of Patent: Feb. 19, 1985

[54] APPARATUS FOR ANGULARLY POSITIONING A ROTARY MEMBER

[75] Inventor: Toshiyuki Tanabe, Komatsu, Japan

[73] Assignee: Kabushiki Kaisha Komatsu Seisakusho, Tokyo, Japan

[21] Appl. No.: 390,846

[22] Filed: Jun. 22, 1982

[51] Int. Cl.³ ............................................. B23B 29/24
[52] U.S. Cl. .................................... 74/825; 74/813 C; 74/813 L
[58] Field of Search ................. 74/813 C, 813 L, 817, 74/822, 825, 388 R

[56] References Cited

U.S. PATENT DOCUMENTS

| | | | |
|---|---|---|---|
| 1,656,313 | 1/1928 | Blood et al. | 74/817 |
| 3,283,883 | 11/1966 | Cruzen, Jr. | 74/817 |
| 3,483,767 | 12/1969 | Schachte . | |
| 3,572,175 | 3/1971 | Deprez | 74/825 |
| 4,417,486 | 11/1983 | Tsukiji et al. | 74/813 R |

FOREIGN PATENT DOCUMENTS 53-95379 8/1978 Japan .
56-152554 11/1981 Japan .

*Primary Examiner*—Gary L. Smith
*Assistant Examiner*—Michael F. Trettel
*Attorney, Agent, or Firm*—Armstrong, Nikaido, Marmelstein & Kubovcik

[57] ABSTRACT

An apparatus for angularly positioning a rotary member such as turn table, etc. by employing two separate motors. First motor is connected to drive the rotary member in a work operation and second servo motor is connected to drive the rotary member in a servo angular positioning movement. A power transmission mechanism is connected with the first motor to rotate the rotary member in the work operation and a coupling mechanism including a clutch therein is connected with the second motor to rotate the rotary member in the servo movement. A first detector is provided to detect a predetermined angular reference position of the clutch and a second detector is disposed to detect a predetermined reference position of the rotary member. Upon detection of the predetermined reference position of the rotary member, a locking device is actuated to stop the rotary member at the predetermined reference position and then the clutch is brought into engagement. A controller is connected with the second motor and with the first and second detectors to regulate the servo operation.

6 Claims, 4 Drawing Figures

APPARATUS FOR ANGULARLY POSITIONING A ROTARY MEMBER

BACKGROUND OF THE INVENTION

This invention relates to a mechanism for orienting a rotary member such as turn table, etc. in a predetermined angular position.

In a machine tool construction it is frequently necessary for accurately positioning a turn table in a predetermined angularly oriented position. This accurate positioning is needed for variety of purposes. For example, when effecting a turning work and a drilling work in a row, the accurate angular positioning of the turn table is required in an automatic operation.

To attain an accurate angular positioning of the turn table, it is desirable to employ a separate servo drive in addition to a main drive. To this end, a separate servo drive is provided solely for effecting the angular positioning of the turn table. An independent drive mechanism is provided for rotating the turn table in a work operation and this independent drive mechanism is rendered inoperative when the positioning movement is being effected by the servo drive.

U.S. Pat. No. 3,483,767 discloses such a separate servo drive mechanism for accurately positioning a rotary spindle; but this prior art device is disadvantageous in that it takes a relatively long time for angularly orienting the rotary spindle in a predetermined angular position.

Japanese Laid-Open Patent Publication No. 53-95379 discloses another prior art which employs two detectors, i.e. a rough detector and a fine detector. This prior art device can shorten the time required for angularly indexing the rotary member, but a control system thereof becomes very complicated.

Co-pending U.S. application Ser. No. 254,268, now U.S. Pat. No. 4,417,486, assigned to same assignee of this application discloses an apparatus for angularly positioning a rotary member such as turn table, etc. by employing two separate motors. First motor is connected to drive the rotary member in a work operation through a power transmission mechanism while second servo motor is connected to drive the rotary member in a servo angular positioning movement through a coupling mechanism including a single position clutch.

Although the apparatus disclosed in this co-pending application is satisfactory in practical use, it nevertheless contains some disadvantages due to employment of the single position clutch. In particular, the single position clutch is expensive and engagement shock load imposed on the single position clutch due to rotary inertia of the rotary member can not be avoided and may sometimes damage the clutch itself.

SUMMARY OF THE INVENTION

It is therefore an object of the present invention to provide an apparatus for angularly positioning a rotary member which overcomes the above noted problems and can provide a very short net time for angular indexing of the rotary member.

Another object of the present invention is to provide an apparatus for angularly positioning a rotary member wherein a servo drive system for angular positioning operation can be set to a predetermined angular reference position while a work operation is being effected, contributing to a shortened net time for angular indexing of the rotary member.

A further object of the present invention is to provide an apparatus for angularly positioning a rotary member wherein the exact angular reference position is first established at the side of smaller mass, i.e. servo motor side and then the rotary member is positioned at the exact angular reference position thereof.

A still further object of the present invention is to provide an apparatus for angularly positioning a rotary member wherein coupling means for connecting a servo drive system with the rotary member is engaged after the rotary member is exactly positioned at the predetermined reference position.

In accordance with an aspect of the present invention, there is provided an apparatus for angularly positioning a rotary member, comprising: first drive means connectible to rotate said rotary member in a work operation; power transmission means operable to connect said first drive means with said rotary member for rotating said rotary member in a work operation; second drive means connectible to rotate said rotary member in an angular positioning movement; coupling means actuatable to connect said second drive means to said rotary member for rotating said rotary member while said first drive means is disconnected from said rotary member, said coupling means including a pair of complementary clutch members adapted to be engageable at any position and normally biased to a disengaged position relative to each other; first detector means for detecting a predetermined angular reference position of one of said clutch members which is positioned to the side of said second drive means and generating a first signal upon detection; a controller responsive to the first signal of said first detector means for controlling the movement of said second drive means so as to stop said one clutch member at said predetermined angular reference position; second detector means for detecting a predetermined angular reference position of said rotary member, said second detector means being operated by the rotary movement of said rotary member when said rotary member approches to said predetermined angular reference position thereof and generating a second signal upon detection; and means responsive to the second signal of said second detector means for stopping said rotary member at said predetermined angular reference position thereof; said controller sequentially rendering said coupling means engaged after effecting stoppage of said rotary member at said predetermined angular reference position thereof.

The above and other objects, features and advantages of the present invention will be readily apparent from the following description taken in conjunction with the accompanying drawings.

DESCRIPTION OF THE PREFERRED EMBODIMENT

Figure 1:
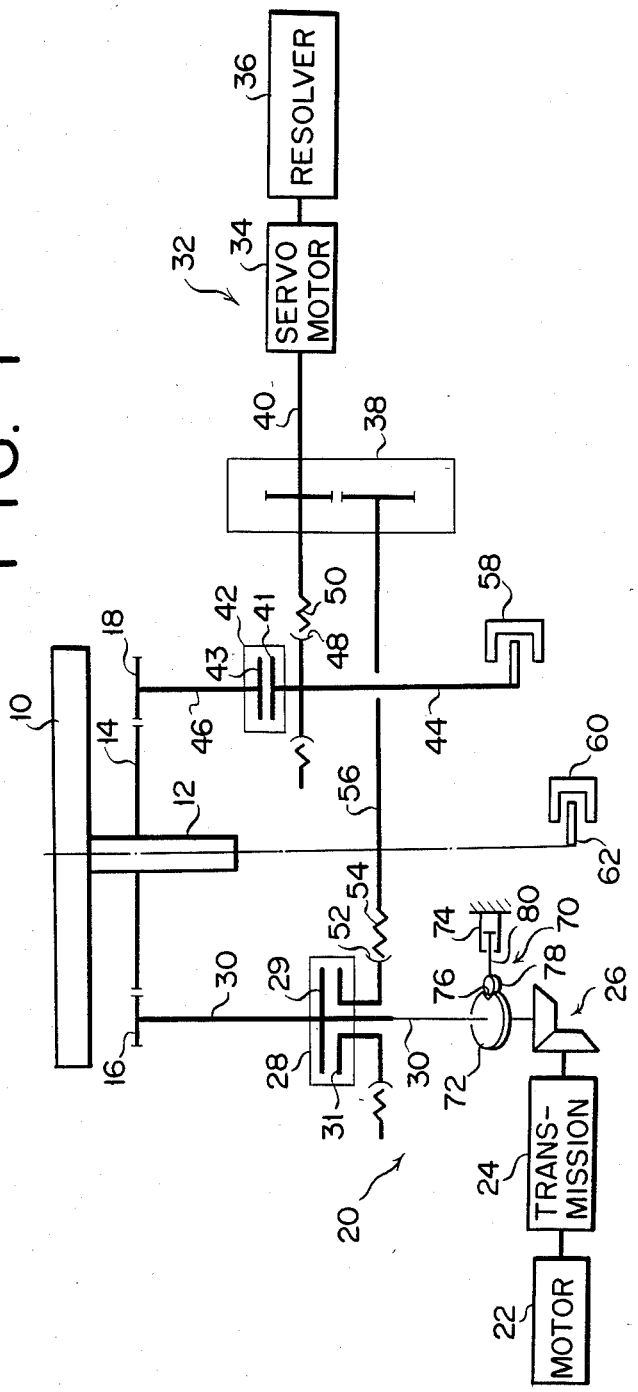
FIG. 1 is a schematic illustration of an apparatus for angularly positioning a rotary member according to the present invention.

The present invention will now be described in detail with reference to the accompanying drawings. Referring first to FIG. 1, reference numeral 10 denotes a turn table rotatable about its spindle or main shaft 12.

Fixedly secured to the spindle 12 is a gear 14 which is in mesh with gears 16 and 18. Designated generally by reference numeral 20 is a main drive system for work operation.

The main drive system 20 includes a motor 22, a power transmission 24, bevel gears 26 and a clutch 28 mounted on a shaft 30 extending therethrough.

That is, input and output shafts of the clutch 28 are integrally formed with each other. The clutch 28 comprises an output side clutch member 29 fixedly mounted on the shaft 30 and an input side clutch member 31 mounted for rotation on the shaft 30 and engageable with the output side clutch member 29 at any angular position. The gear 16 is fixedly mounted on the shaft 30 at the top end thereof. The power transmission 24 includes high and low speed change-over gears and a clutch formed therein (both are not shown).

The shaft 30 is operatively associated with a lock means 70 and is adapted to be locked against rotation when the lock means 70 is actuated. The lock means 70 comprises a disk member 72 fixedly secured to the shaft 30 and a piston-cylinder means 74 mounted on a housing (not shown), which is operable either hydraulically or pneumatically. A notch 76 is formed in a single peripheral position of the disk member 72. A roller 78 is mounted to the leading end of a piston rod 80 of the piston-cylinder means 74. When the roller 78 is brougtht into engagement with the notch 76 by actuating the piston-cylinder means 74, the shaft 30 is locked against rotation.

Generally designated by reference numeral 32 is a servo drive system for angularly positioning and indexing the turn table 10.

The servo drive system 32 comprises a servo motor 34, a resolver 36 operatively connected with the servo motor 34, a gear backlash eliminating mechanism 38 mounted on a shaft 40 coupled with the servo motor 34 and a clutch 42. The clutch 42 comprises an input side clutch member 41 fixedly mounted on an input shaft 44 and an output side clutch member 43 fixedly mounted on an output shaft 46.

The clutch members 41 and 43 are adapted to be engageable with each other at any angular position. The gear 18 is fixedly mounted on the output shaft 46 at the upper end thereof while a worm wheel 48 is fixedly mounted on the input shaft 44 and is in mesh with a worm 50 formed at one end of the shaft 40.

A similar worm wheel 52 is coupled with the input side clutch member 31 of the clutch 28. In mesh with the worm wheel 52 is a worm 54 formed at one end of a shaft 56 extending from the gear backlash eliminating mechanism 38.

A detection switch 58 is mounted on the housing (not shown) of the apparatus and is adapted to be turned on by each rotation of the input shaft 44. The switch 58 functions to detect a predetermined angular reference position of the clutch members 31 and 41 and thereby to stop and hold the servo motor 34 at that position. When the switch 58 is turned on the resolver 36 is returned or reset to its starting position.

In the illustrated embodiment, two clutches 28 and 42 are employed and therefore the turn table 10 is rotated by two different routes for servo angular positioning operation thereof. The reason for providing two clutches as illustrated is to eliminate a possible backlash of the servo drive system 32.

The clutches 28 and 42 are adapted to be electrically excited and mechanically engaged at any angular position when being excited.

With engagement of the clutch 28, the shaft 30 is rotated by the servo motor 34. In order to avoid the rotation of the shaft 30 from being transmitted to the motor 22, the clutch (not shown) in the power transmission 24 is disengaged during the servo drive operation.

Although two clutches are employed in the illustrated embodiment, it is of course possible to employ only one clutch 28 or 42 for the purpose of angularly positioning the turn table 10.

In the illustrated embodiment, gear ratio between the gear 14 and the gears 16 and 18 is set at 9 to 1, therefore when the turn table 10 makes a complete turn, the lock means 70 has nine (9) chances for engagement if the piston-cylinder means 74 is actuated. If the clutches 28 and 42 were allowed to engage nine times during one complete turn of the turn table 10, angular orientation of the turn table 10 at each engaging point of the clutches 28 and 42 would be different. To avoid this, a detection switch 60 is provided on the housing adjacent to the spindle 12 for allowing the lock means 70 to engage only once during a complete turn of the turn table 10.

Figure 2:
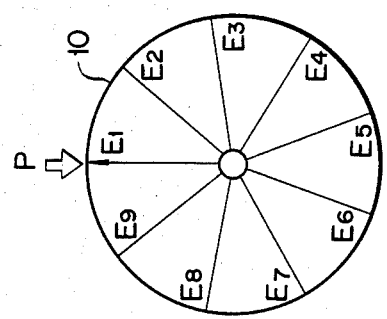
FIG. 2 is a schematic illustration of a turn table showing a relationship between a single predetermined reference position $E_1$ of the turn table and possible engagement positions $E_1$–$E_9$ of a lock means for angularly orienting an input shaft to a predetermined position.

To be specific, the detection switch 60 is adapted to be switched on by a dog 62 mounted on the spindle 12 only once by a complete turn of the spindle 12 and held being switched on within a limited period of time as the turning of the spindle 12 continues. With the detection switch 60 being turned on, "ON" signal therefrom is transmitted through a control unit 64 to the piston-cylinder means 74 to actuate it, allowing the roller 78 to engage with the notch 76 only at a predetermined angular reference position $E_1$ on the turn table 10 as shown in FIG. 2. In FIG. 2 "P" is a reference position mark set on the housing side.

Figure 3:
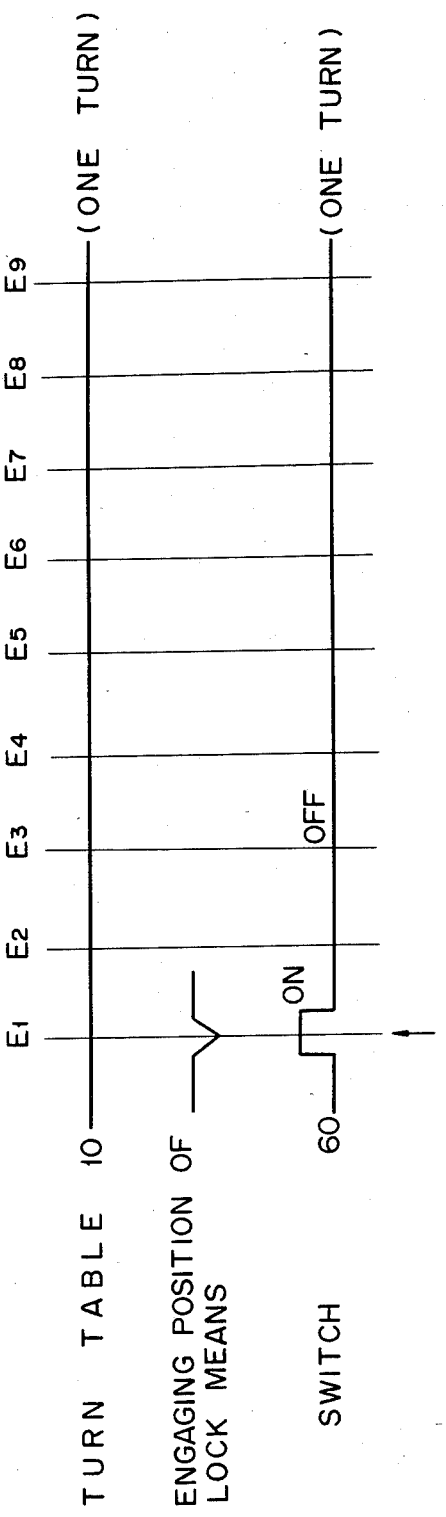
FIG. 3 is a diagram showing an operational relationship between the turn table, lock means and second detector associated with the rotary movement of the turn table.

For understanding this lock means engagement sequences, reference is being made to FIG. 3.

When the switch 60 is turned on at $E_1$ position on the turn table 10, the roller 78 is allowed to engage with the notch 76 of the disk member 72 because only at this position the piston-cylinder means 74 is actuated.

Although gear ratio between the gear 14 and the gears 16 and 18 is set at 9 to 1 in the embodiment, other gear ratio can of course be adopted.

Figure 4:
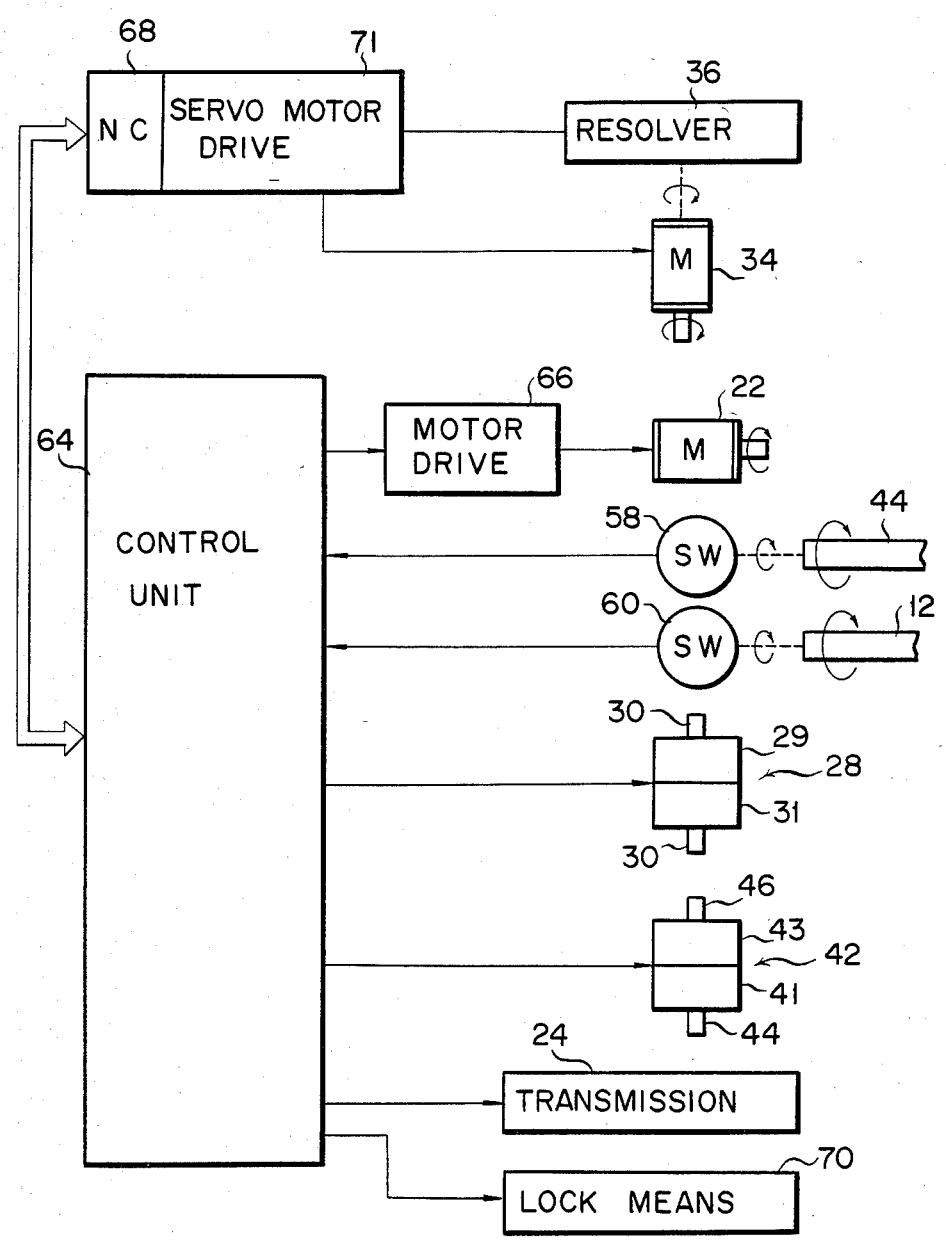
FIG. 4 is a block diagram of a control system employed in the present invention.

Referring now to FIG. 4 showing a block diagram of the control system, the control unit 64 is connected with the motor 22 through a motor drive 66, the switches 58 and 60, the clutches 28 and 42 and the clutch (not shown) in the transmission 24 to control them.

Also connected with the control unit 64 is a numerical control (NC) 68 and signals are transmitted frequently therebetween. Actually these two units are not separated but closely interconnected therebetween. Signals from the resolver 36 are fed into a servo motor drive 71 where those signals are compared with signals from the NC unit 68 and the servo motor drive 71 generates a drive signal for driving the servo motor 34.

The operation of the present invention will now be set forth below.

(1) During a turning operation the turn table 10 is rotated by the motor 22 through the transmission 24.

(2) When the turning operation is finished, the motor 22 is stopped.

(3) Then for angularly positioning the clutch members 31 and 41 at a predetermined angular reference position, the servo motor 34 is rotated.

The rotation of the servo motor 34 is not transmitted to the turn table 10 since the clutches 28 and 42 are disengaged at this step.

(4) When the detection switch 58 is turned on by the rotation of the input shaft 44, the servo motor 34 is stopped instantaneously and electrically held at that position.

This also means the clutch members 31 and 41 are exactly positioned at a predetermined angular reference position.

These two steps (3) and (4) are usually carried out during a turning operation without adversely affecting thereto.

For assuring this, the detection switch 60 is arranged and cotrolled not to be turned on during the turning operation, leaving the lock means 70 and therefore the clutches 28 and 42 disengaged.

(5) After locating the predetermined angular reference position of the clutch members 31 and 41, the motor 22 is rotated for angularly positioning the turn table 10 at a predetermined reference position.

During this operation, only one side clutch members 29 and 43 are rotated because both the clutches 28 and 42 remain disengaged and the other side clutch members 31 and 41 are held stationary by the servo motor 34 which is electrically locked during this step.

(6) When the reference position mark $E_1$ on the turn table 10 approaches to the reference position mark P on the housing, the detection switch 60 is turned on by the dog 62 mounted on the spindle 12 and the motor 22 is slowed down thereby.

(7) Upon the turning on of the detection switch 60, the piston-cylinder means 74 is actuated to thereby extend the piston rod 80 and the motor 22 is slowed down. The disk member 72 rotates slowly by the motor 22 and the notch 76 of the disk member 72 engages the roller 78 of the extended piston rod 80 to thereby completely stop the rotation of the disk member 72 and the motor 22 instantaneously. When this occurs, the turn table 10 stops as well at a position where the predetermined reference position mark $E_1$ on the turn table 10 exactly registers with the reference position mark P on the housing.

(8) After the turn table 10 stops with the reference position mark $E_1$ on the turn table 10 being in exact registration with the reference position mark P on the housing, the control unit 64 sends out a signal to engage the clutches 28 and 42. This sequential control is preprogrammed in the control unit 64.

(9) After the clutches 28 and 42 are completely engaged, a signal is sent out from the control unit 64 to retract the piston rod 80.

With this step (9) the angualr positioning of the turn table 10 at a predetermined reference position with the clutches 28 and 42 being fully engaged has been completed after the turn table 10 stops at any angular position.

(10) Then, in accordance with a stored input signal from the NC, the angular indexing of the turn table 10 is performed by driving the servo motor 34.

As described in greater detail hereinabove, according to the present invention, a servo motor system can be set at a predetermined angular reference position while a turning operation is still being effected on a workpiece. As a result, a required time for angularly positioning the turn table at a predetermined reference position can be shortened dramatically.

Besides, since the exact angular reference position is established at the side of smaller mass, i.e. servo motor side, the whole mechanism can be simplified considerably.

Furthermore, with the provision of the lock means, the clutches are allowed to engage after the turn table stops completely. Therefore no engagement shock load may be imposed on the clutches.

Although the illustrative embodiment of the invention has been described in detail for the purpose of disclosing a practical operative structure whereby the invention may be practised advantageously, it is to be understood that the particular apparatus described is intended to be illustrative only and that the novel characteristics of the invention may be incorporated in other structural forms without departing from the spirit and scope of the invention as defined in the appended claims.

What I claim is:

1. An apparatus for angularly positioning a rotary member, comprising:

first drive means connectible to rotate said rotary member in a work operation;

power transmission means operable to connect said first drive means with said rotary member for rotating said rotary member in a work operation;

second drive means connectible to rotate said rotary member in an angular positioning movement;

coupling means actuatable to connect said second drive means to said rotary member for rotating said rotary member while said first drive means is disconnected from said rotary member, said coupling means including a pair of complementary clutch members adapted to be engageable at any position and normally biased to a disengaged position relative to each other;

first detector means for detecting a predetermined angular reference position of one of said clutch members which is positioned to the side of said second drive means and generating a first signal upon detection;

a controller responsive to the first signal of said first detector means for controlling the movement of said second drive means so as to stop said one clutch member at said predetermined angular reference position;

second detector means for detecting a predetermined angular reference position of said rotary member, said second detector means being operated by the rotary movement of said rotary member when said rotary member approches to said predetermined angular reference position thereof and generating a second signal upon detection; and means responsive to the second signal of said second detector means for stopping said rotary member at said predetermined angular reference position thereof;

said controller sequentially rendering said coupling means engaged after effecting stoppage of said rotary member at said predetermined angular reference position thereof.

2. An apparatus for angularly positioning a rotary member as recited in claim 1 wherein said power transmission means includes shaft means and wherein said means for stopping said rotary member at said predetermined angular reference position thereof comprises a member fixedly secured to said shaft means, said member having a notch formed therein, cylinder means having a piston rod, said cylinder means being adapted to be actuated in response to the second signal of said second detector means, and an engaging member mounted to the leading end of said piston rod whereby upon actuation of said cylinder means said engaging member is brought into engagement with said notch.

3. An apparatus for angularly positioning a rotary member as recited in claim 1 further comprising third detector means connected with said second drive means for detecting the movement of said second drive means and providing signals denoting increments of that movement.

4. An apparatus for angularly positioning a rotary member as recited in claim 3 wherein said third detector means is connected to said controller and is adapted to be reset to the starting position when said first detector means detects the predetermined angular reference position of said one clutch member.

5. An apparatus for angularly positioning a rotary member as recited in claim 1 further comprising gear backlash eliminating means disposed between said second drive means and said coupling means and wherein said coupling means is provided in a pair.

6. An apparatus for angularly positioning a rotary member as recited in claim 1, 2, 3, 4 or 5 further comprising means for feeding data into said controller so that said controller is responsive to the data to regulate the operation of said second drive means for rotating said rotary member from said predetermined angular reference position to another selected angular position as designated by said date.

* * * * *